(12) United States Patent
Muniswamy-Reddy et al.

(10) Patent No.: US 10,158,709 B1
(45) Date of Patent: Dec. 18, 2018

(54) IDENTIFYING DATA STORE REQUESTS FOR ASYNCHRONOUS PROCESSING

(71) Applicant: Amazon Technologies, Inc., Seattle, WA (US)

(72) Inventors: Kiran-Kumar Muniswamy-Reddy, Sammamish, WA (US); Wei Xiao, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 530 days.

(21) Appl. No.: 14/745,278

(22) Filed: Jun. 19, 2015

(51) Int. Cl.
*G06F 9/54* (2006.01)
*H04L 29/08* (2006.01)
*G06F 17/30* (2006.01)

(52) U.S. Cl.
CPC .... *H04L 67/1095* (2013.01); *G06F 17/30578* (2013.01)

(58) Field of Classification Search
CPC .......................................................... G06F 9/54
USPC .................................................. 707/609, 615
See application file for complete search history.

(56) References Cited

U.S. PATENT DOCUMENTS

| | | | | |
|---|---|---|---|---|
| 7,437,727 B2 * | 10/2008 | Leong | ................... | G06F 3/0601 710/24 |
| 7,689,998 B1 * | 3/2010 | Chrysanthakopoulos | ................... | G06F 9/4881 718/104 |
| 8,037,122 B2 | 10/2011 | Saha et al. | | |
| 8,185,610 B2 | 5/2012 | Goff et al. | | |
| 8,943,196 B2 | 1/2015 | Concini et al. | | |
| 8,977,590 B2 * | 3/2015 | Habermann | ........ | G06F 11/1438 707/609 |
| 2002/0107842 A1 * | 8/2002 | Biebesheimer | ... | G06F 17/30864 |
| 2002/0152190 A1 * | 10/2002 | Biebesheimer | ... | G06F 17/30867 |
| 2006/0026214 A1 | 2/2006 | Berg et al. | | |
| 2007/0143460 A1 | 6/2007 | Ben-David et al. | | |
| 2008/0196037 A1 * | 8/2008 | Ple | ........................ | G06F 9/3851 718/107 |
| 2010/0131957 A1 * | 5/2010 | Kami | .................... | G06F 9/5077 718/104 |
| 2013/0219371 A1 * | 8/2013 | Masser | ............... | G06F 11/3466 717/128 |

(Continued)

OTHER PUBLICATIONS

Mark Spruiell, "Asynchronous Method Dispatch (AMD) in Java", Ice 3.5.1 Manual, Apr. 29, 2011, Copyright 2014 ZeroC, Inc., pp. 1-5.

*Primary Examiner* — Kim T Nguyen
(74) *Attorney, Agent, or Firm* — Robert C. Kowert; Meyertons, Hood, Kivlin, Kowert & Goetzel, P.C.

(57) ABSTRACT

A data storage system that implements identifying data store requests for asynchronous processing. A request may be received at a frontend task engine that processes requests for a network-based data store. The frontend task engine may evaluate the request to determine whether the request should be processed asynchronously. For a request identified for asynchronous processing, the task engine may initiate processing of the request at backend task engines for the network-based data store. Resources for processing the request at the frontend task engine may be reclaimed for processing other requests. A task sweeper that collects data for the network-based data store may detect that processing of the request has completed. The task sweeper may also provide an indication of the completion of the request.

20 Claims, 7 Drawing Sheets

(56) References Cited

U.S. PATENT DOCUMENTS

2015/0186192 A1\* 7/2015 Dyakin .................... G06F 9/54
                                                                                                    719/313

\* cited by examiner

IDENTIFYING DATA STORE REQUESTS FOR ASYNCHRONOUS PROCESSING

BACKGROUND

Several leading technology organizations are investing in building technologies that sell "software-as-a-service". Such services provide access to shared storage (e.g., database systems) and/or computing resources to clients, or subscribers. Within multi-tier e-commerce systems, different resources may be allocated to subscribers and/or their applications from whole machines, to CPU, to memory, to network bandwidth, and to I/O capacity.

Database systems managing large amounts of data on behalf of users may receive a high volume of request traffic to access data and to manage the storage of data. The workload and time to perform these requests may vary greatly. The resources to process these requests may thus differ. In order to maximize efficiency when handling these requests, the resources of the database systems may have to be managed differently for different kinds of requests. Otherwise, techniques for handling one type of request may prove inefficient for handling other types of requests, which may ultimately impact the experience of clients utilizing the database system.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may be employed in various combinations and in various embodiments to implement identifying requests directed to network-based data stores for asynchronous processing. Network-based data stores offer accessible and scalable storage to one or more multiple different clients. Depending on the type of data stored or the management of the data (e.g., database storage, key-value storage, etc.), requests to the network-based data store can vary greatly in the work and time to process and complete a request. Network-based data stores that offer clients the ability to request actions that vary so widely may have to account for the differences such requests can make when planning how requests are handled.

Figure 1:
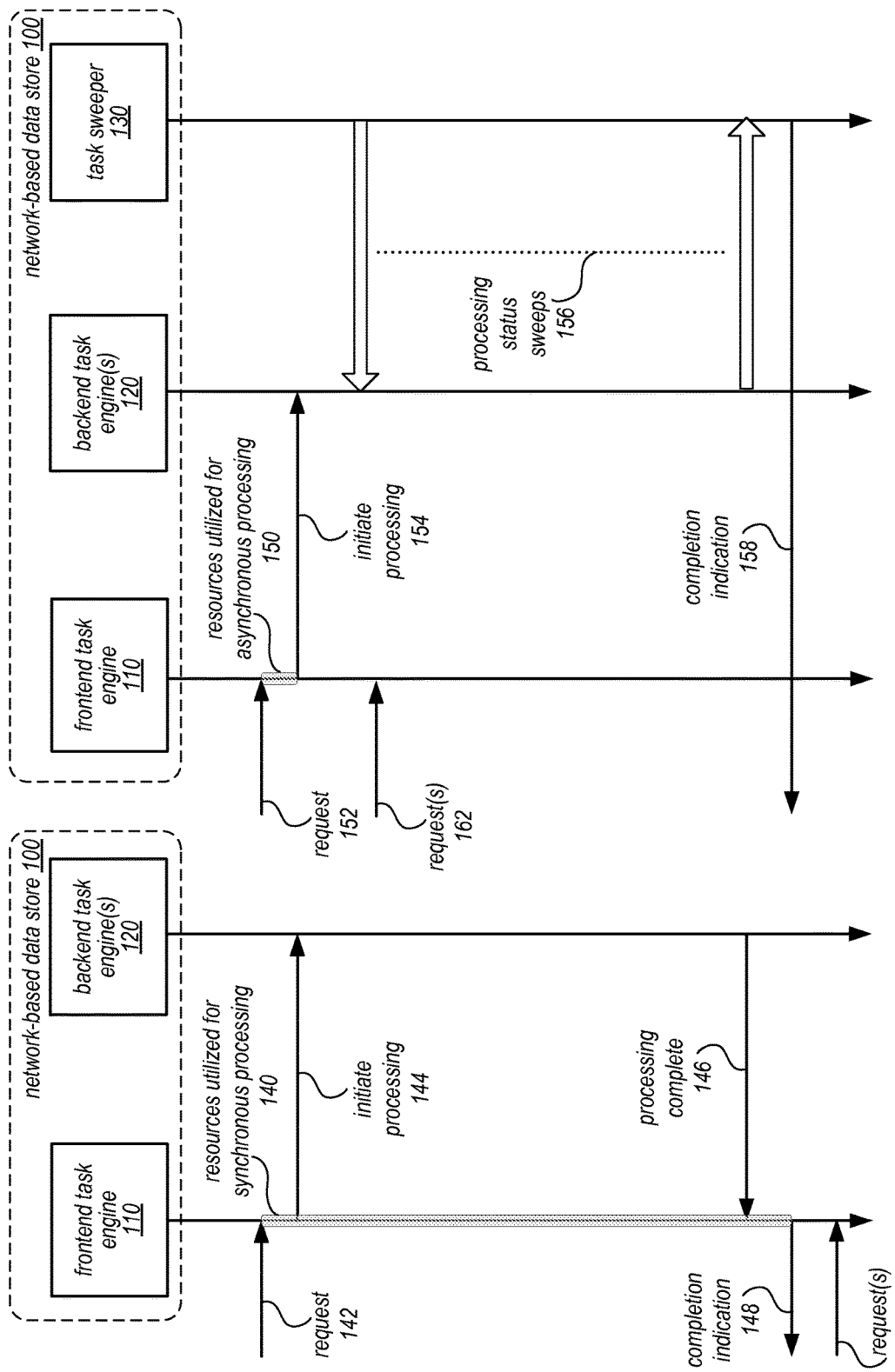
FIGS. 1A and 1B are sequence diagrams illustrating synchronous and asynchronous processing for requests directed to network-based data stores, according to some embodiments.

Synchronous processing techniques may be implemented for processing requests directed to network-based data stores in order to provide a consistent experience for the handling of requests. A task engine, or other component that handles a request, performs synchronous processing by blocking any further execution on resources allocated to handling a request or utilizing resources, such as memory resources or other processing resources to maintain state information in order to process the request. For instance, a processing thread, may be assigned to processing a request that is received. The thread may exclusively handle the request, performing no work for other requests received at the task engine. FIG. 1A illustrates an example of synchronous processing for a network-based data store. Network-based data store 100 may be data storage accessed via a network which maintains data for one or more clients. Network-based data store may implement frontend task engine 110 to process requests that are received at network-based data store to perform different actions (e.g., access data, create new data, delete data, change performance or organization of data at the data store, etc.). Network-based data store may also implement backend task engine(s) 120 to perform further processing of tasks. For instance, in at least some embodiments, data stored for a client may be distributed amongst multiple locations for storage. Each of these storage locations may have respective backend task engine(s) that process requests that pertain to or include data stored at the respective location. In this way, request processing may be performed in parallel to provide quicker processing times for requests.

As illustrated in FIG. 1A, a request 142 is received at frontend task engine 110 for processing. Frontend task engine may identify the request for synchronous processing and may therefore utilize a set of resources (e.g., a thread and/or memory) at the frontend task engine for the duration of processing the request, as illustrated at 140. As part of processing the task frontend task engine 110 may initiate processing of the request 144 at backend task engine(s) 120. While backend task engine(s) are processing the request, frontend task engine may block utilization of the frontend task engine 110 resources utilized for processing the request 140 until receiving a notification (e.g., a callback notification or function) that processing of the request is complete 146 from backend task engine(s) 120. For instance, a thread processing the request may suspend or perform no other work until the processing is complete 146 at the backend task engine(s) and/or memory maintaining state information describing the request (e.g., client identity, request type, response type, etc.) may be unusable for storing other information until the completion indication 148 is sent. Once frontend task engine provides an indication of the requests completion 148 (e.g., to a request client or other system), then the resources 140 may be reclaimed for processing another request or performing another task at frontend task engine 110. For instance, request(s) 160 may then be accepted for processing.

While synchronous processing provides many beneficial qualities, the resources utilized for synchronous processing are often waiting on the performance of other components (e.g., backend task engine(s) 120). In scenarios where network-based data store 100 experiences high volumes of requests, the resources to process requests at frontend task engine may become useless for periods of time where the resources are not actually performing any work (e.g., a thread that is performing no other tasks) or available to be utilized for processing other requests (e.g., a memory storing state information that may have to be maintained). Moreover, if a large portion of requests have long processing times (e.g., requests that take hours or days to process), frontend task engine 110 may be forced to reject requests for lack of resources to process them. Continuing with the examples of resources given above, no more threads may be available to process requests and/or no more memory may be available to maintain state information. However, identifying certain requests for asynchronous processing may allow a frontend task engine to process some requests synchronously when beneficial and other requests asynchronously when beneficial.

FIG. 1B illustrates a sequence diagram for performing asynchronous processing for a received request. Request 152 may be received at frontend task engine 110 which may identify the request for asynchronous processing. For instance, in some embodiments, the request type may be used to determine that the request is processed asynchronously, such as discussed below with regard to FIG. 6. In some embodiments, a predicated processing time for the request may be determined and compared with an asynchronous processing time threshold, which if exceeded indicates that the request should be processed asynchronously. As request 152 has been identified by frontend task engine 110 for asynchronous processing, resources utilized for asynchronous processing 150 may only be allocated to processing the request until processing is initiated at backend task engine(s) 120 (and any other preliminary or initializing tasks are performed by frontend task engine 110). The resources 150 (e.g., thread and/or memory) may then be reclaimed for processing other request(s) 162. While backend task engine(s) 120 are processing the request, network-based data store 100 may implement task sweeper 130 to sweep backend task engine(s) 120 for updates to processing status 156 for the request. For example, task sweeper 130 may periodically poll backend task engine(s) 120 for the status information about requests being processed at a backend task engine 120. Based on the collected status information, task sweeper 130 may detect when processing for the request has completed. For example, task sweeper may maintain a list or set of data that describes the backend task engine(s) 120 that are processing part of the request and once all of the described backend task engine(s) have reported statuses of completion of the request, then task sweeper may provide completion indication 158. Completion indication 158 may be an update to request status information maintained in another component of network-based data store 100 or send back to a client that sent the request, in some embodiments. In this way, requests that have long processing times may be completed in the background while frontend task engine 110 may continue to process other requests (which may be processed synchronously or asynchronously depending on frontend task engine's 110 evaluation). Additionally, clients that submit requests are unaware of whether the request is processed synchronously or asynchronously, allowing the processing of the same requests to change dynamically (e.g., from synchronous to asynchronous).

Please note that previous descriptions are not intended to be limiting, but are merely provided as logical examples of identifying requests directed to network-based storage for asynchronous processing. Various other communications, components, or timing of actions may be implemented. For instance, other systems such as a reporting system may receive completion indications and provide responses, such as acknowledgments, results, or other information associated with a request to clients.

This specification begins with a general description of storage service implementing a network-based data store that may also identify requests for asynchronous processing. Then various examples of the storage service are discussed, including different components/modules, or arrangements of components/module, that may be employed as part of implementing the storage service. A number of different methods and techniques to identify requests to network-based data stores for asynchronous processing are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
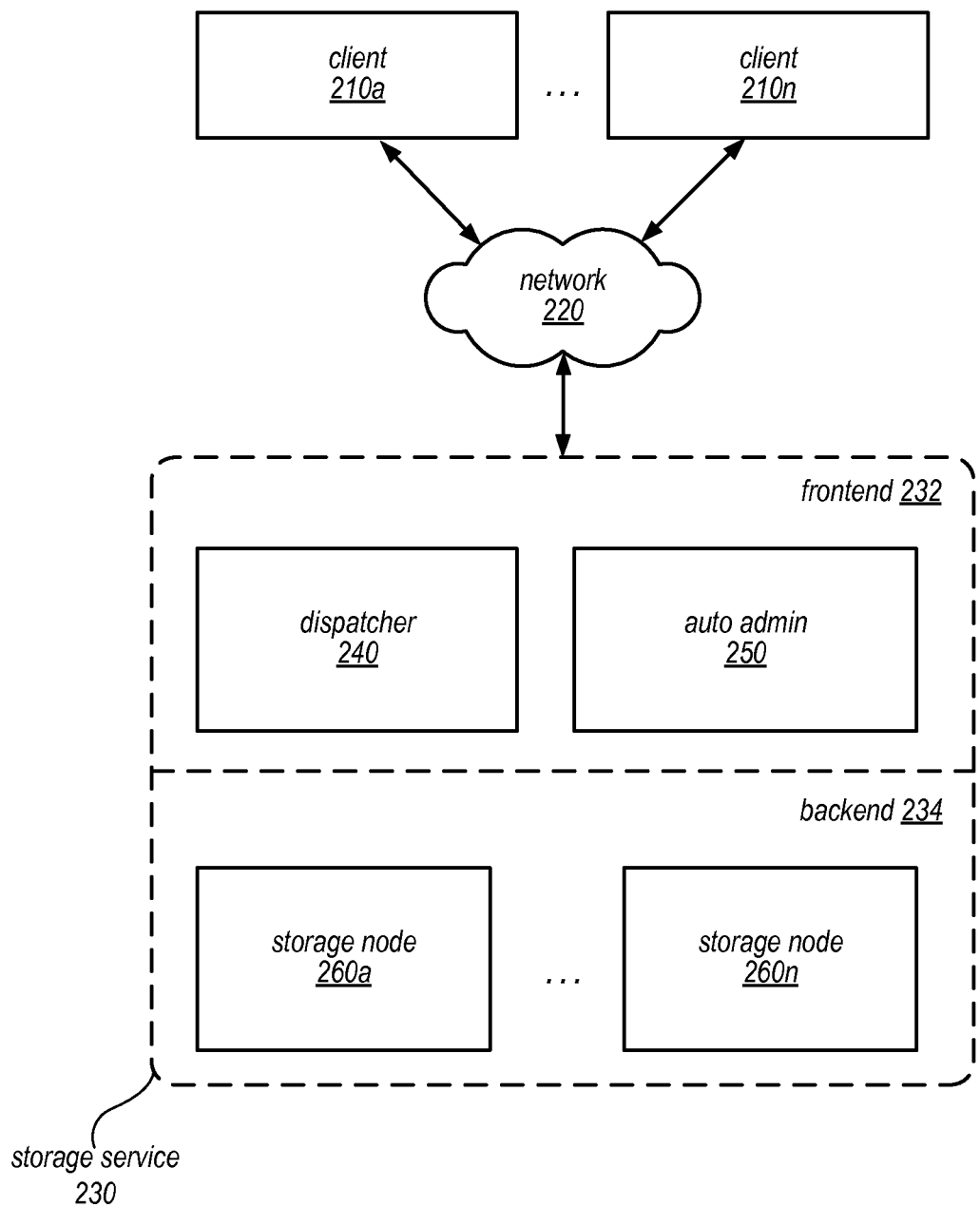
FIG. 2 is a block diagram illustrating a storage service, according to some embodiments.

FIG. 2 is a block diagram illustrating a storage service, according to some embodiments. It is noted that where one or more instances of a given component may exist, reference to that component herein below may be made in either the singular or the plural. However, usage of either form is not intended to preclude the other. In various embodiments, the components illustrated in FIGS. 2-4 may be implemented directly within computer hardware, as instructions directly or indirectly executable by computer hardware (e.g., a microprocessor or computer system), or using a combination of these techniques. For example, the components of FIG. 2 may be implemented by a distributed system including a number of computing nodes (or simply, nodes), such as computing system 1000 in FIG. 7 described below. In various embodiments, the functionality of a given storage service system component may be implemented by a particular computing node or may be distributed across several computing nodes. In some embodiments, a given computing node may implement the functionality of more than one storage service system component.

Generally speaking, clients 210*a*-210*n* may encompass any type of client configurable to submit web services requests to network-based storage service 230 via network 220. For example, a given storage service client 210 may include a suitable version of a web browser, or a plug-in module or other type of code module configured to execute as an extension to or within an execution environment provided by a web browser to provide database or data storage service clients (e.g., client applications, users, and/or subscribers) access to the services provided by network-based services platform 230. Alternatively, a storage service client 210 may encompass an application such as a database application, media application, office application or any other application that may make use of persistent storage resources. In some embodiments, such an application may include sufficient protocol support (e.g., for a suitable version of Hypertext Transfer Protocol (HTTP)) for generating and processing web services requests without necessarily implementing full browser support for all types of web-based data. That is, storage service client 210 may be an application configured to interact directly with network-based storage service 230. In various embodiments, storage service client 210 may be configured to generate web services requests according to a Representational State Transfer (REST)-style web services architecture, a document- or message-based web services architecture, or another suitable web services architecture.

In some embodiments, storage service client 210 may be configured to provide access to network-based storage service 230 to other applications in a manner that is transparent to those applications. For example, storage service client 210 may be configured to integrate with an operating system or file system to provide storage in accordance with a suitable variant of the storage model described herein. However, the operating system or file system may present a different storage interface to applications, such as a conventional file system hierarchy of files, directories and/or folders. In such an embodiment, applications may not need to be modified to make use of the storage system service model described herein. Instead, the details of interfacing to network-based storage service 230 may be coordinated by storage service client 210 and the operating system or file system on behalf of applications executing within the operating system environment.

Storage service clients 210 may convey web services requests to and receive responses from network-based storage service 230 via network 220. In various embodiments, network 220 may encompass any suitable combination of networking hardware and protocols necessary to establish web-based communications between clients 210 and network-based storage service 230. For example, network 220 may generally encompass the various telecommunications networks and service providers that collectively implement the Internet. Network 220 may also include private networks such as local area networks (LANs) or wide area networks (WANs) as well as public or private wireless networks. For example, both a given client 210 and network-based storage service 230 may be respectively provisioned within enterprises having their own internal networks. In such an embodiment, network 220 may include the hardware (e.g., modems, routers, switches, load balancers, proxy servers, etc.) and software (e.g., protocol stacks, accounting software, firewall/security software, etc.) necessary to establish a networking link between given client 210 and the Internet as well as between the Internet and network-based storage service 230. It is noted that in some embodiments, storage service clients 210 may communicate with network-based storage service 230 using a private network rather than the public Internet. For example, clients 210 may be provisioned within the same enterprise as the data storage service (and/or the underlying system) described herein. In such a case, clients 210 may communicate with network-based storage service 230 entirely through a private network 220 (e.g., a LAN or WAN that may use Internet-based communication protocols but which is not publicly accessible).

Generally speaking, network-based storage service 230 may be configured to implement one or more service endpoints configured to receive and process web services requests, such as requests to access tables maintained on behalf of clients/users by a database service or a data storage service, and/or the items and attributes stored in those tables. For example, network-based storage service 230 may include hardware and/or software configured to implement various service endpoints and to properly receive and process HTTP-based web services requests directed to those endpoints. In one embodiment, network-based storage service 230 may be implemented as a server system configured to receive web services requests from clients 210 and to forward them to various components that collectively implement a data storage system for processing. In other embodiments, network-based storage service 230 may be configured as a number of distinct systems (e.g., in a cluster topology) implementing load balancing and other request management features configured to dynamically manage large-scale web services request processing loads.

As illustrated in FIG. 3, network-based storage service 330 may include a dispatcher 340 (which may be configured to receive, authenticate, parse, throttle and/or dispatch service requests, among other things), one or more administrative components, or auto admin instances, 350 (which may be configured to provide a variety of visibility and/or control functions, as described in more detail herein) which may be implemented as part of frontend 232. Storage service 230 may also implement a plurality of storage node instances (shown as 360a-360n), each of which may maintain and manage one or more tables on behalf of clients/users or on behalf of the data storage service (and its underlying system) itself, as part of backend 234. Some of the functionality provided by each of these types of components is described in more detail herein, according to various embodiments. Note that in some embodiments, network-based storage service 330 may include different versions of some of the components illustrated in FIG. 3 to provide functionality for creating, accessing, and/or managing tables maintained in database instances within a single-tenant environment than those that provide functionality for creating, accessing, and/or managing tables maintained in database instances within a multi-tenant environment. In other embodiments, functionality to support both multi-tenant and single-tenant environments may be included in any or all of the components illustrated in FIG. 2. Note also that in various embodiments, one or more database instances may be implemented on each of the storage nodes 360a-360n, and each may store tables on behalf of clients. Some of these database instances may operate as if they were in a multi-tenant environment, and others may operate as if they were in a single-tenant environment. In some embodiments, database instances that operate as in a multi-tenant environment may be implemented on different computing nodes (or on different virtual machines executing on a single computing node) than database instances that operate as in a single-tenant environment.

In various embodiments, network-based storage service 230 may be configured to support different types of web services requests. For example, in some embodiments, network-based storage service 230 may be configured to implement a particular web services application programming interface (API) that supports a variety of operations on tables (or other data objects) that are maintained and managed on behalf of clients/users by the data storage service system (and/or data stored in those tables). Examples of the operations supported by such an API are described in more detail herein.

In addition to functioning as an addressable endpoint for clients' web services requests, in some embodiments network-based storage service 230 may implement various client management features. For example, service 230 may coordinate the metering and accounting of client usage of web services, including storage resources, such as by tracking the identities of requesting clients 210, the number and/or frequency of client requests, the size of tables and/or items stored or retrieved on behalf of clients 210, overall storage bandwidth used by clients 210, class of storage requested by clients 210, and/or any other measurable client usage parameter. Network-based storage service 230 may also implement financial accounting and billing systems, or may maintain a database of usage data that may be queried and processed by external systems for reporting and billing of client usage activity. In some embodiments, network-based storage service 230 may include a lock manager and/or a bootstrap configuration (not shown).

In various embodiments, the data storage service described herein may provide an application programming interface (API) that includes support for some or all of the following operations on the data in a table maintained by the service on behalf of a storage service client: put (or store) an item, get (or retrieve) one or more items having a specified primary key, delete an item, update the attributes in a single item, query for items using an index, scan (e.g., list items) over the whole table, optionally filtering the items returned, and create one or more secondary indexes global to the whole table which may be used to perform different queries efficiently over particular attributes in the table that are used to create the secondary index. The amount of work required to satisfy service requests that specify these operations may vary depending on the particular operation specified and/or the amount of data that is accessed and/or transferred between the storage system and the client in order to satisfy the request. Thus, storage service 230 may identify some requests for synchronous processing while other requests may be identified for asynchronous processing.

In some embodiments, the service (and/or the underlying system that implements the service) may support a strong consistency model, in addition to supporting eventually consistent read operations. In some embodiments, service requests made via the API may include an indication of one or more user preferences, such as a preferred consistency model, a preferred service request throughput level, or a service request throughput level for which a guarantee is requested. In other embodiments, some or all of these user preferences may be specified when a table is created, or may be client-specific, account-specific, specific to various table types, or specified by system-wide default values, rather than being specified on a per-request basis. The API may support extreme scaling and/or more predictable performance than that provided by prior data storage systems and services.

In some embodiments, a partition replica may be assigned to a particular storage node based largely (or solely) on whether there is enough storage capacity for the anticipated size of the table. For example, the anticipated size may be based on information included in a request to create the table, on usage history for the client on whose behalf the table was created, or on a history of accesses that target the table, the partition, or the replica itself (e.g., if this is a partition replica that is being reassigned as part of a move operation). In such embodiments, there may or may not be enough throughput capacity for the partition replica on the selected storage node (or storage device thereof). For example, a disk to which the partition replica is assigned may be oversubscribed in terms of IOPS, the actual number of IOPS may be more than was expected, or the provisioned (or committed) number of IOPS may have grown after the partition replica was created (e.g., using an UpdateTable operation to increase the provisioned throughput capacity for read operations and/or write operations). In some embodiments, an UpdateTable operation may be invoked by a client through a graphical user interface (GUI). In other embodiments, an UpdateTable operation may be invoked through an UpdateTable API whose inputs include an identifier of the table for which additional throughput capacity is desired, a desired (e.g., increased) number of IOPS for read operations and/or a desired (e.g., increased) number of IOPS for write operations. In some or all of these cases, the partition replica may need to be moved to another storage node (or storage device) or split into two new (smaller) partitions, each of which may be hosted on a different storage device (or storage node).

In various embodiments, a database service or data storage service may be implemented on one or more computing nodes that are configured to perform the functionality described herein. In some embodiments, the service may be implemented by a network-based storage service (such as network-based storage service 230 in FIG. 2) that is made up of multiple computing nodes, each of which may perform one or more of the functions described herein. Various collections of the computing nodes may be configured to provide the functionality of an auto-admin cluster, a cluster of resources dedicated to the data storage service, and a collection of external resources (which may be shared with other network-based services or applications, in some embodiments).

In some embodiments, the database systems described herein may support seamless scaling of user tables in a "fully shared nothing" type architecture. For example, in some embodiments, each database partition may be implemented as a completely independent parallel computation unit. In such embodiments, the system may not provide distributed coordination across partitions or support batch "put" operations and/or multi-statement transactions. In some embodiments, as long as the workload distribution is well spread across partitions, an increase in the number of partitions may result in a larger usable table size and/or increased throughput capacity for service requests. As described herein, in some embodiments, live repartitioning (whether programmatic/automatic or explicitly initiated) may be employed to adapt to workload changes. In other words, in some embodiments, repartitioning (including partition moving, partition splitting, and/or other partition management operations) may be performed while service requests directed to the affected partitions continue to be received and processed (i.e. without taking the source partition off-line).

In some embodiments, a service (and/or underlying system) may support a variety of service offerings and/or throughput models. In some embodiments, the service may support a committed work throughput offering and/or a best effort offering. In some embodiments, a committed work throughput level may be specified in terms of a measure of normalized, logical work units (or logical service request units) over time, and may represent a work throughput level that is guaranteed by the system. For example, in systems that provide database or data storage services (e.g., in tables maintained on behalf of clients), a storage service client (e.g., a client application, user, or subscriber having access to the service) may specify a preference between multiple throughput options that are offered by the service, according to a variety of business models, subscription types, and/or payment models. For example, the client/user may indicate a preferred throughput model for a particular table through a parameter of a request to create the table, in some embodiments. In other embodiments, a client/user may specify a default throughput model for all tables created and maintained on their behalf by the data storage service. By supporting both a committed throughput model and a best effort throughput model (for which no throughput guarantees are made), the system may allow clients/users to make a trade-off between performance and cost, according to their needs and/or budgets. Other types of services may support a committed work throughput model and/or other throughput models.

A storage service (and underlying system) that provides a committed throughput offering may be configured to pre-allocate capacity and/or resources for the creation, growth, and management of a table maintained on behalf of a client/user in response to traffic directed to the table, and not to overbook the resources and/or capacity of the storage node(s) on which that table is maintained. In some embodiments, tables maintained by the service (and underlying system) under a committed throughput model may be maintained in faster (and often more expensive) storage resources, such as high performance media (e.g., flash memory or Solid State Drive, or SSD, media), in order to provide extremely low latencies when servicing requests from the client/user. For example, the system may provide (and dedicate) a high ratio of fast/local memory to main (e.g., disk) memory for the maintenance of those tables (and various partitions thereof). While the storage resources allocated to a given table under a committed throughput model may in some cases be underutilized (at least some of the time), the client/user may value the predictable performance afforded by the committed throughput model more than the additional (and in some cases wasted) costs of dedicating more resources than may always be necessary for that table. Similarly, resources that are pre-allocated to other types of services to support a committed work throughput model may in some cases be underutilized (at least some of the time), but may provide the client/user with a predictable level of performance (e.g., in terms of availability and/or responsiveness).

As described herein, in some embodiments the systems described herein may support both a multi-tenant model and a single-tenant model. In such some embodiments, the client/user may indicate a preferred one of these tenancy models for a particular table through a parameter of a request to create the table. In other embodiments, a client/user may specify a default or initial tenancy model for all tables created and maintained on their behalf by the data storage service.

Figure 3A:
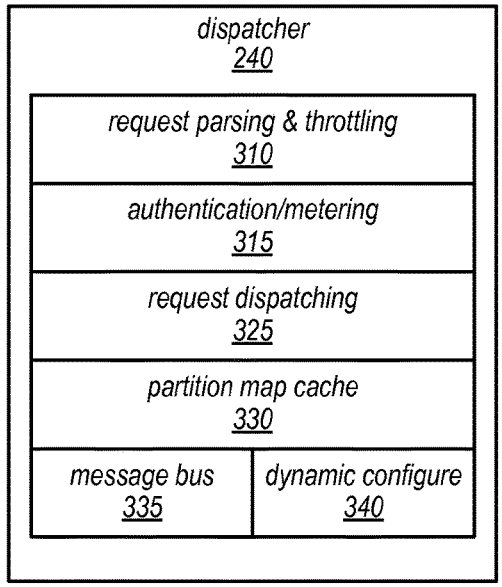
FIGS. 3A-3C are block diagrams illustrating various components of a storage service, according to some embodiments.
Figure 3B:
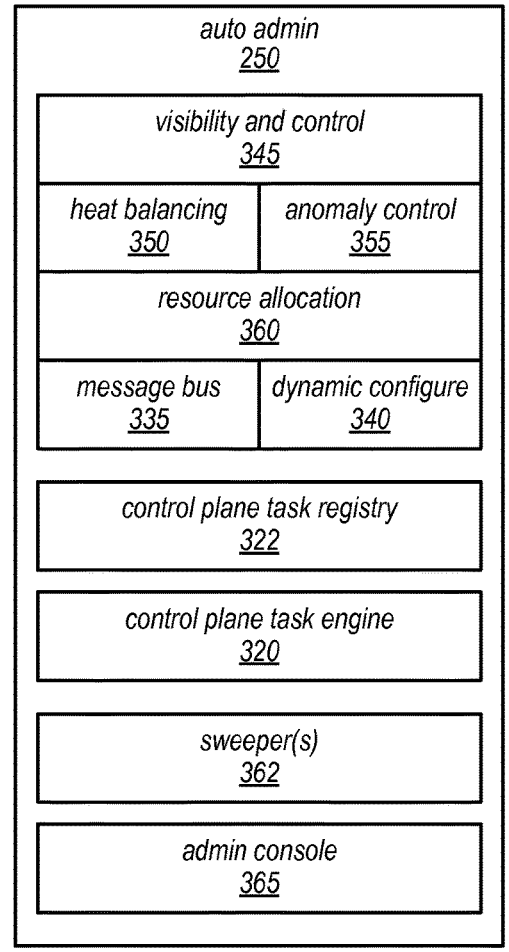
Figure 3C:
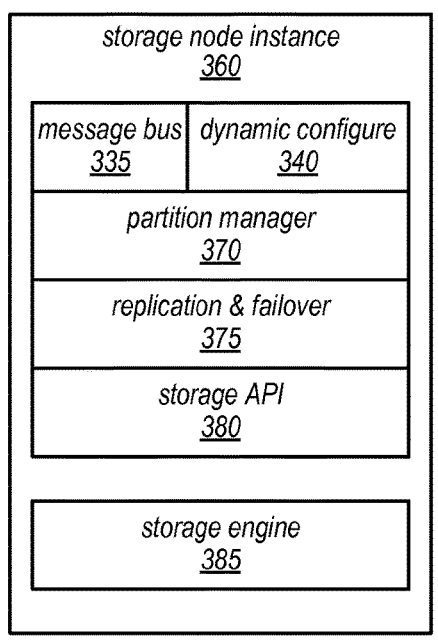

FIGS. 3A-3C illustrate various elements or modules that may be included in each of the types of components of network-based storage service 230, according to one embodiment. As illustrated in FIG. 3A, dispatcher 240 may include one or more modules configured to perform parsing and/or throttling of service requests (shown as 310), authentication and/or metering of service requests (shown as 315), dispatching service requests (shown as 325), and/or maintaining a partition map cache (shown as 330). In addition to these component-specific modules, dispatcher 240 may include components that are common to multiple types of computing nodes that collectively implement Web services platform 330, such as a message bus (shown as 335) and/or a dynamic configuration module (shown as 340). In other embodiments, more, fewer, or different elements may be included in dispatcher 240, or any of the elements illustrated as being included in dispatcher 240 may be included in another component of network-based storage service 230 or in a component configured to interact with network-based storage service 230 to provide the data storage services described herein.

As illustrated in FIG. 3B, auto admin instance 250 may include one or more modules configured to provide visibility and control to system administrators (shown as 345), or to perform heat balancing (shown as 350), and/or anomaly control (shown as 355), resource allocation (shown as 360). In some embodiments, resource allocation module 360, heat balancing module 350, anomaly control module 355, control plane event registry 322, control plane task engine 320, and/or sweeper module(s) 362, may be configured to work separately or in combination to perform identifying requests for asynchronous processing and performing asynchronous processing of requests, as described in more detail below. Auto admin instance 250 may also include an admin console 365, through which system administrators may interact with the data storage service (and/or the underlying system). In some embodiments, admin console 365 may be the primary point of visibility and control for the data storage service (e.g., for configuration or reconfiguration by system administrators). For example, admin console 365 may be implemented as a relatively thin client that provides display and control functionally to system administrators and/or other privileged users, and through which system status indicators, metadata, and/or operating parameters may be observed and/or updated.

Auto admin instance 250 may include, in some embodiments control plane task registry 322. Control plane task registry 322 may provide an interface or access to information stored about one or more detected control plane events, such as requests to be processed, at storage service 230. In at least some embodiments, control plane task registry 322 may be implemented to interface with a table or data object that can be changed, updated or written to by other modules of auto admin instance 250, such as sweeper modules 362 or control plane task engine 320. For example, in some embodiments control plane event data may be stored on a database table that is accessible via control plane task registry 322. In at least some embodiments, other service systems, nodes, devices, instances, etc. may send registration messages for detected control plane events, updates, or some other form of request to auto admin instance 250 for storage in task registry 322.

Control plane event registration messages may, in various embodiments, include information about the detected control plane event. For example, control plane event messages may include the event trigger, such as a particular client or module (e.g., sweeper module). Information about the one or more control plane operations to be performed in response to the control plane event, such as the request type or the resources to be utilized (e.g., storage nodes) may be included.

Auto admin instance 250 may also include control plane task engine 320. As noted above, in some embodiments, multiple instances of auto-admin 250 may be implemented with one instance performing the control plane task engine function, and other deputy instances implementing the sweeper(s). However, in some embodiments a single auto-admin instance may be configured to perform both task scheduling and implement the tasks handlers to perform the scheduled control plane event operations.

Control plane task engine 320 may be configured to direct the performance of different types of control plane operations among the nodes, systems, or devices implementing network-based storage service 230. For instance, task engine 320 may be configured to communicate with master nodes of clusters of storage nodes to initiate the performance of various control plane operations, such as moves, splits, update tables, delete tables, create indexes, etc. . . . Task engine 320 may also be configured to update task registry 322 (or some other table or data structure) with the status, state, or performance information of the tasks currently being performed. For example, for each child operation or subtask of a control plane operation, an update may be sent to update a respective entry in the record of the detected event to which the operation corresponds. Control plane task engine 320 may also provide updates indicating the resources that are currently utilized to perform the control plane operation, such as the particular replica, data, node, system, or device.

In various embodiments, control plane task engine 320 may be configured to perform an update table operation type. An update table operation may change or modify a performance attribute or value for the maintained table. For instance, in some embodiments, tables may have a provisioned throughput performance (e.g., a certain number of IOPS). An update table operation may change the provisioned throughput performance of the table to a different throughput performance. An update table operation may perform various sub-tasks or child operations. Upon completion or initiation of these or various other steps for performing an update table operation, task handler 150 may be configured to send/write updates to control plane event registry 120 for the detected event. An update table event may be triggered externally, for example by a client API request. In at least some embodiments, an update table API request may be identified for asynchronous processing. Alternatively, one or more internal maintenance operations, such as sweeper modules 362 may trigger an update table operation.

In various embodiments, control plane task engine may be configured to perform a secondary index creation operation in response to a client API request. For instance, in some embodiments, attributes of table may be identified for the creation of a new index for the table. Control plane task engine 320 may identify new storage node instance(s) 360 to host the index and direct storage node instance(s) 360 in the performance of scanning, building, and copying of the index to the new storage nodes instance(s) 360. In at least some embodiments, a create secondary index API request may be identified for asynchronous processing.

In addition to these component-specific modules, auto admin instance 250 may also include components that are common to the different types of computing nodes that collectively network-based storage service 230, such as a message bus (shown as 335) and/or a dynamic configuration module (shown as 340). In other embodiments, more, fewer, or different elements may be included in auto admin instance 250, or any of the elements illustrated as being included in auto admin instance 250 may be included in another component of network-based storage service 230 or in a component configured to interact with network-based storage service 230 to provide the data storage services described herein.

As illustrated in FIG. 3C, storage node instance 360 may include one or more modules configured to provide partition management (shown as 370), to implement replication and failover processes (shown as 375), and/or to provide an application programming interface (API) to underlying storage (shown as 380 Various different ones of the control plane operations described above may be performed locally (e.g., on a given storage node instance 360) based, e.g., on one or more measures of the utilization of provisioned resources on the storage devices or logical storage volumes of the storage node instance.

As noted above, different storage nodes may be implementing or maintaining resources in multiple different arrangements, some of which may be part of larger collections or groups of resources. A replica group, for example, may be composed of a number of storage nodes maintaining a replica of particular portion of data (e.g., a partition of a table) for the storage service. Moreover, different replica groups may utilize overlapping nodes, where a storage node may be a member of multiple replica groups, maintaining replicas for each of those groups whose other storage node members differ from the other replica groups. Thus if, for example replica group 1 has storage nodes A, B, and C, replica group 2 may have storage nodes B, D, and E. Besides differing groups of storage nodes, in various embodiments, storage nodes may have different relationships to other storage nodes. Continuing with the above example, for replica group 1, storage node A may be a master node, performing special functions with regard to access requests directed toward the partition maintained by replica group 1. For replica group 2, however, storage node B may be the master node. Therefore, a storage node's relationship to other storage nodes may be different depending on the particular grouping evaluated. These various examples of different arrangements of resources among storage nodes highlight the various different ways that control plane operations may interact with resources that are not solely devoted to one particular (though they may be) function, data replica, etc.

As illustrated in this example, each storage node instance 360 may include a storage engine 385, which may be configured to maintain (i.e. to store and manage) one or more tables (and associated table data) in storage 380 (which in some embodiments may be a non-relational database) on behalf of one or more clients/users. In addition to these component-specific modules, storage node instance 360 may include components that are common to the different types of computing nodes that collectively implement Network-based storage service 230, such as a message bus (shown as 335) and/or a dynamic configuration module (shown as 340). In other embodiments, more, fewer, or different elements may be included in storage node instance 360, or any of the elements illustrated as being included in storage node instance 360 may be included in another component of network-based storage service 230 or in a component configured to interact with network-based storage service 230 to provide the data storage services described herein.

Note that in some embodiments, it may not be necessary to perform some or all of the throttling, authentication, and/or metering operations that would typically be provided by dispatcher 240 in multi-tenant environments for tables operating in a single-tenant environment. For example, the system may be configured to elide these operations when servicing requests directed to tables in a single-tenant environment, but to perform them when servicing requests directed to tables in a multi-tenant environment. Similarly, in some embodiments, some of the operations illustrated as being performed by auto admin instance 250 (e.g., heat balancing and/or resource allocation) may or may not be applied in managing tables in a single-tenant environment. However, other operations illustrated as being performed by auto admin instance 250 (or various modules thereof) may be applied in the creation and/or management of tables in both multi-tenant and single-tenant environments.

The systems underlying the data storage service described herein may store data on behalf of storage service clients (e.g., client applications, users, and/or subscribers) in tables containing items that have one or more attributes. In some embodiments, the data storage service may present clients/users with a data model in which each table maintained on behalf of a client/user contains one or more items, and each item includes a collection of attributes. The attributes of an item may be a collection of name-value pairs, in any order. In some embodiments, each attribute in an item may have a name, a type, and a value. Some attributes may be single valued, such that the attribute name is mapped to a single value, while others may be multi-value, such that the attribute name is mapped to two or more values. In some embodiments, the name of an attribute may always be a string, but its value may be a string, number, string set, or number set. The following are all examples of attributes: "ImageID"=1, "Title"="flower", "Tags"={"flower", "jasmine", "white"}, "Ratings"={3, 4, 2}. The items may be managed by assigning each item a primary key value (which may include one or more attribute values), and this primary key value may also be used to uniquely identify the item. In some embodiments, a large number of attributes may be defined across the items in a table, but each item may contain a sparse set of these attributes (with the particular attributes specified for one item being unrelated to the attributes of another item in the same table), and all of the attributes may be optional except for the primary key attribute(s). In other words, unlike in traditional databases, the tables maintained by the data storage service (and the underlying storage system) may have no pre-defined schema other than their reliance on the primary key. Note that in some embodiments, if an attribute is included in an item, its value cannot be null or empty (e.g., attribute names and values cannot be empty strings), and, and within a single item, the names of its attributes may be unique. However, in at least some other embodiments, traditional database schemes may be employed, such as the various types of relational databases implemented using Server Query Language (SQL).

In various embodiments, the service (and/or the underlying system) may enforce pre-determined size limits on table names, items, attribute values, primary key values, and/or attribute names. For example, in some embodiments, the total size of all the attribute names and values in an item (i.e. the row size) may be limited. These attributes may also be described by system resource metadata and anomalies between these attributes and system resource metadata may be detected.

The database and data storage services described herein (and/or the underlying system) may provide an application programming interface (API) for requesting various operations targeting tables, items, and/or attributes maintained on behalf of storage service clients. In some embodiments, the service (and/or the underlying system) may provide both control plane APIs and data plane APIs. The control plane APIs provided by the data storage service (and/or the underlying system) may be used to manipulate table-level entities, such as tables and indexes and/or to re-configure various tables These APIs may be called relatively infrequently (when compared to data plane APIs). In some embodiments, the control plane APIs provided by the service may be used to create tables, import tables, export tables, delete tables, explore tables (e.g., to generate various performance reports or skew reports), modify table configurations or operating parameter for tables (e.g., by modifying the amount of throughput capacity, adding storage capacity for additional read replicas, splitting partitions or moving partitions), and/or describe tables. In some embodiments, control plane APIs that perform updates to table-level entries may invoke asynchronous workflows to perform a requested operation. Methods that request "description" information (e.g., via a describeTables API) may simply return the current known state of the tables maintained by the service on behalf of a client/user. The data plane APIs provided by the data storage service (and/or the underlying system) may be used to perform item-level operations, such as storing, deleting, retrieving, and/or updating items and/or their attributes, or performing index-based search-type operations across multiple items in a table, such as queries and scans.

The APIs provided by the service described herein may support request and response parameters encoded in one or more industry-standard or proprietary data exchange formats, in different embodiments. For example, in various embodiments, requests and responses may adhere to a human-readable (e.g., text-based) data interchange standard, (e.g., JavaScript Object Notation, or JSON), or may be represented using a binary encoding (which, in some cases, may be more compact than a text-based representation). In various embodiments, the system may supply default values (e.g., system-wide, user-specific, or account-specific default values) for one or more of the input parameters of the APIs described herein.

As noted above, the control plane APIs supported by the service may include APIs that perform updates on tables (e.g., a CreateTable API and/or a DeleteTable API). In various embodiments, these APIs may invoke asynchronous workflows to perform the requested operation. In addition, the service may support methods that return the current known state (e.g., a DescribeTables API) or that return various skew metrics or reports (e.g., an ExploreTable API). In some embodiments, a common use model may be for a client to request an action (e.g., using a CreateTable API), and then to poll on its completion via the corresponding description API (e.g., DescribeTables). Other supported methods may be used to modify table configurations or parameters, e.g., an UpdateTable API (which may be used to increase the provisioned throughput capacity for a given table), a PurchaseTableCapacity API (which may be used to increase the provisioned storage capacity for a given table), a SplitTable API (which may be used to explicitly invoke an operation to split a table or any of its partitions), or a MoveTable API (which may be used to explicitly invoke an operation to move one or more tables, partitions of a table, or partition replicas of a table).

In some embodiments in which the system provides database or data storage services to clients, the system may provide an application programming interface (API) that includes support for some or all of the following operations on data maintained in a table by the service on behalf of a storage service client: put (or store) an item, get (or retrieve) one or more items having a specified primary key, delete an item, update the attributes in a single item, query for items using an index, and scan (e.g., list items) over the whole table, optionally filtering the items returned. For example, the data storage service (and/or underlying system) described herein may provide various data plane APIs for performing item-level operations, such as a PutItem API, a GetItem (or GetItems) API, a DeleteItem API, and/or an UpdateItem API, as well as one or more index-based seek/traversal operations across multiple items in a table, such as a Query API and/or a Scan API. Note that the amount of work required to satisfy service requests that specify these operations may vary depending on the particular operation specified and/or the amount of data that is accessed and/or transferred between the storage system and the client in order to satisfy the request.

Figure 4:
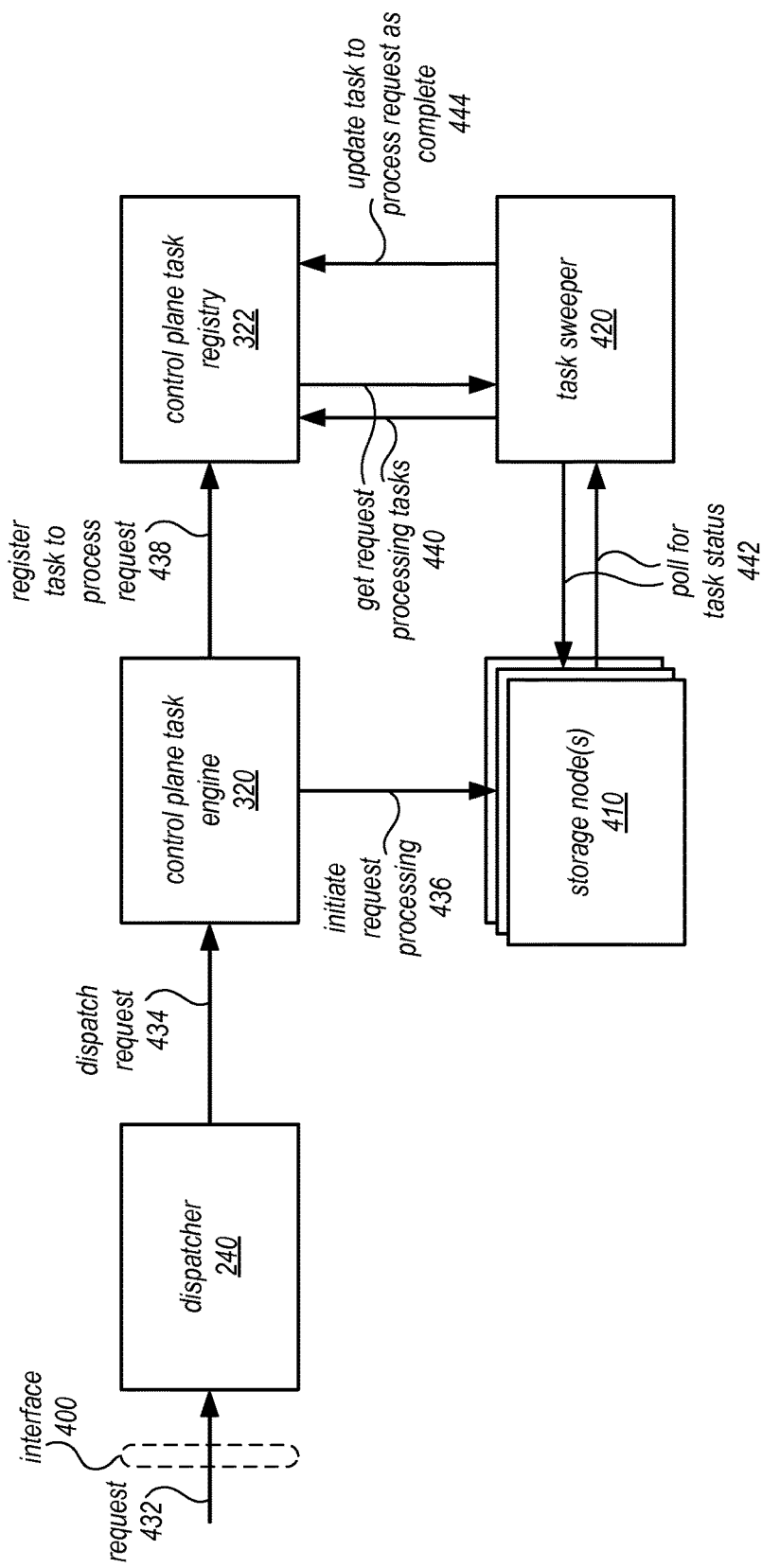
FIG. 4 is a logical block diagram illustrating asynchronous request processing for storage service requests identified for asynchronous processing, according to some embodiments.

FIG. 4 is a logical block diagram illustrating asynchronous request processing for storage service requests identified for asynchronous processing, according to some embodiments. A request 432 is received via interface 400 for the storage service. Interface 400 may be a graphical (e.g., a web-based interface) and/or programmatic (e.g., an Application Programming Interface (API)) interface. Dispatcher 240 may initially receive the request to determine the system to handle the request. For example, control plane task engine 320 may be implemented in distributed fashion across multiple different servers or nodes to process requests. Dispatcher 240 may load balance requests across the different servers to ensure that any one particular server of control plane task engine 320 is not overloaded. Dispatcher 240 may then dispatch the request 434 to control plane task engine 320.

Control plane task engine 320 may allocate resources to process the received request. For instance, in at least some embodiments, a processing thread may handle execution of any tasks to process the request. For instance, the request may be a request to create a secondary index for data table stored in the storage service. The thread may perform tasks to determine storage locations to store the new index and allocate resources at the storage locations to process the request (e.g., allocate storage capacity and throughput capacity for implementing the secondary index). Control plane task engine 320 may initiate request processing 436 at one or more storage node(s) 410 (which may be an example of backend task engines as discussed above in FIG. 1). Consider the secondary index example given above. Instructions may be sent to those storage nodes 410 hosting the data table for which the index is being created. The instructions may specify an attribute, key, or other information used to create the index, as well as provide an identification of the new storage locations previously allocated for storing the new secondary index. Storage node(s) 410 may receive the instructions and begin scanning the data stored for the data table at the respective storage node 410 to build the index. Storage engine(s) 410 may then send the index at upon completion (or as it is being created) to the new storage locations.

In some embodiments, control plane task engine 320 may also register a task to process the request 438 at control plane task registry 320. Control plane task registry may maintain status information indicating the state or status of requests being processed and other tasks performed by the control plane for the storage service. Control plane task registry 320 may accessible to other control plane components in order to make status of ongoing tasks available for performing other functions. Task sweeper 420 (which may be one of task sweepers 360 in FIG. 3 above), for instance, may get request processing tasks 440 in order to determine what requests have not yet been completed. Task sweeper 420 may poll for task status 442 to storage node(s) 410. In some embodiments, task sweeper 420 may perform processing task sweeps as part of collecting other information such as health information, storage node resource utilization, or any other information about the functioning of storage node(s) 410. Task sweeper 420 may evaluate the status information obtained from storage node(s) and if, using the secondary index creation example discussed above, the task sweeper 420 determines that all of the storage node(s) 410 have finished creating the new secondary index, then task sweeper 420 may update the task to process the request for a new secondary index as complete 444 at control plane registry. In some embodiments, task sweeper 420 may collect and send data to other systems or clients of the storage service (e.g., providing query results to clients or to a system of the storage service that provides results to clients).

Figure 5:
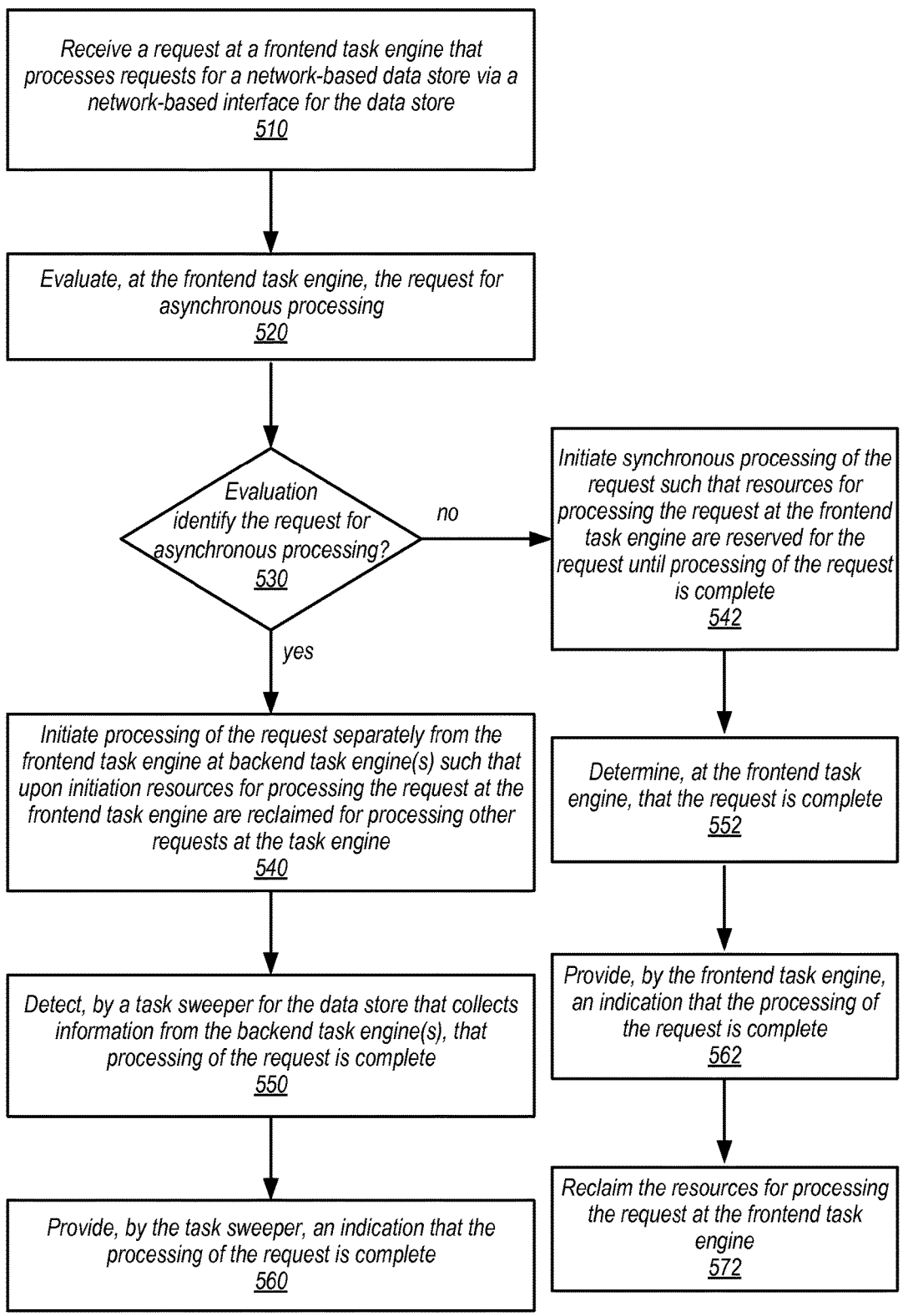
FIG. 5 is a high-level flowchart illustrating various methods and techniques to identify and perform asynchronous processing for requests directed to a network-based data store, according to some embodiments.

Storage systems, such as storage systems or services described above with regard to FIGS. 2-4, provide clients with many different types of actions, operations, or functionalities that may be performed as part of providing data storage services. Identifying requests for asynchronous processing allows frontend task engines for storage systems to intelligent choose how individual requests may be handled. For those types of requests that are long running, asynchronous processing may prevent constraints or bottlenecks with respect to request processing resources from occurring at a frontend task engine. FIG. 5 is a high-level flowchart illustrating various methods and techniques to identify and perform asynchronous processing for requests directed to a network-based data store, according to some embodiments. The various systems and components may implement some or any of the following techniques as may other types of network-based data stores.

As indicated at 510, a request may be received at a frontend task engine that processes requests for a network-based store via a network-based interface for the data store. A frontend task engine may be a task handler, director, manager, or other component which may process or direct the processing of a request for the network-based data store. For instance, a frontend task manager may process a request with respect to handling interactions with a requesting client (e.g., formatting and sending updates, acknowledgements, or responses) along with requesting other system components, such as backend task engines to perform different tasks as part of processing the request.

A network-based interface for the data store may be programmatic (e.g., an API), allowing clients to format requests so as to provide the frontend task engine with enough information to process the request. For example, various requests to change, modify, update, get, put, or otherwise interact with data may be specified according to the API. Additionally, requests may change the performance of the data store, such as changing throughput performance for certain types of requests, or request the creation of new data objects, such as creating additional indexes for data tables.

As indicated at 520, the received request may be evaluated at the frontend task engine for asynchronous processing. The evaluation, as discussed in more detail below with regard to FIG. 6, may be able to identify those requests for which asynchronous is more efficient or beneficial. For instance, a request type for received requests may be identified which may be used to determine whether or not the received request is a long running request and thus may be efficiently processed asynchronously. In at least some embodiments, a predicted processing time may be determined for a request and compared with an asynchronous processing time threshold, to determine whether or not the request is considered long running for the purposes of performing asynchronous processing.

As indicated by the positive exit from 530, for those requests identified for asynchronous processing, processing of the request may be initiated separately from the frontend task engine at backend task engine(s), as indicated at 540. Backend task engine(s) may, in various embodiments, perform portions or all of the work to process a request. Backend task engine(s) may be utilized for both synchronous and asynchronous processing. For instance, the storage nodes discussed above in FIGS. 2-4 may be backend task engines in some embodiments. The frontend task engine may direct, forward, or otherwise provide the backend task engines with the information needed to perform the respective portion of processing the request at the backend. For instance, if a data query request is received, the frontend task engine may send query predicates particular to the data or table stored at storage node to the storage nodes.

Upon completion of initiating the processing of the request at the backend task engines, the resources utilized for processing the request at the frontend task engine may be reclaimed. For example, the frontend task engine may spawn a single processing thread to handle a received request. The thread may be released from handling the request once it has initiated processing of the request at the backend storage engines (as well as performing any other tasks to initiate processing of the request).

As indicated at 550, a task sweeper may detect that processing of the request is complete, in various embodiments. For instance, a task sweeper may be a system component that sweeps backend task engines (and other network-based data store components) to determine the current state of processing tasks ongoing. This collected information may be used to determine whether a particular request has completed processing. For instance, a backend task engine may indicate a complete status for processing a particular request (e.g., identified by a request identifier). The task sweeper may have access to information describing the request, such as the task registry discussed above in FIGS. 3 and 4, which indicates how particular request is processed and/or how to determine completion (e.g., identifies the backend task engines to query for status). In at least some embodiments, the task sweeper may periodically, or aperiodically, poll the different backend task engines.

As indicated at 560, an indication may be provided by the task sweeper that the processing of the request is complete, in various embodiments. For instance, the task sweeper may update processing status for the request, such as the task registry discussed above in FIGS. 3 and 4, or may send a message or indication to a client or other system or component which may generate appropriate acknowledgments or communications. Task sweepers may also detect when requests fail to complete and provide similar indications, such as status updates.

For those requests that are not identified for asynchronous processing, as indicated by the negative exit from 530, synchronous processing of the request may be performed. As indicated at 542, synchronous processing of the request may be initiated such that resources for processing the request at the frontend task engine are served for the request until processing of the request is complete. For instance, an execution thread for handling the request may remain live at the frontend task engine even after directing backend task engines to perform work for processing the request (as well as any other action to process the request). As indicated at 552, the frontend task engine may determine when the request is complete. For instance, the frontend may poll the backend task engine(s) for status for processing the request. Then, as indicated at 562, the frontend task engine may provide an indication that processing of the request is complete. Similar to the task sweeper, the frontend task engine may update status information, such as the task registry in FIGS. 3 and 4, to indicate that the request has completed, or may send a message or indication to a client or other system component of the network-based data store to indicate that the request is completed. As indicated at 572, the resources for processing the request at the frontend task engine, such as the thread, may be reclaimed for performing other tasks, such as processing other requests.

Figure 6:
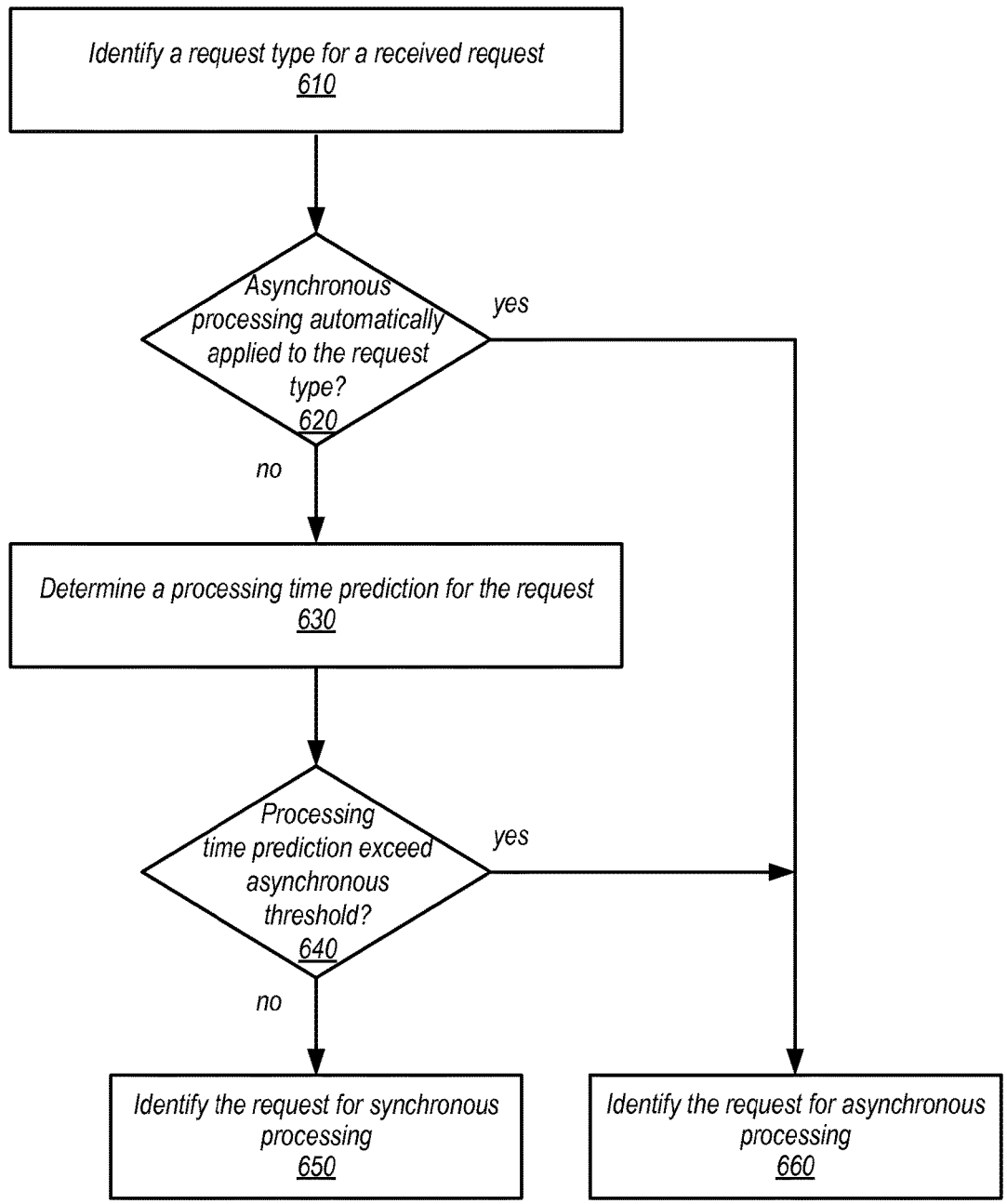
FIG. 6 is a high-level flowchart illustrating various methods and techniques to evaluate requests for asynchronous processing, according to some embodiments.

Asynchronous processing of requests efficiently utilizes the resources of a frontend task engine to process long running request. Instead of reserving frontend task engine resources for the entire time that the request is processed, the resources for the request, as discussed above, can be reclaimed for performing other tasks. Therefore, intelligent evaluation of requests received at a network-based data store may increase the efficiency of performing asynchronous processing by identifying those requests for which asynchronous processing is more efficient than other types of processing, such as synchronous processing. FIG. 6 is a high-level flowchart illustrating various methods and techniques to evaluate requests for asynchronous processing, according to some embodiments.

As indicated at 610, a request may be received at a frontend task engine and a request type may be identified for the request, in some embodiments. The request type may be identified according to various information included in the request. For example, the request may be formatted according to a network-based interface (e.g., API) for the data store. The network-based interface may allow for several different types of requests, such as requests to update data, get data, change data formatting, delete data, create new data objects based on data, or otherwise modify the performance of different components within the data store, such as storage nodes or other backend task engines. Various flags, keywords, identifiers, format, or other information in the request that conforms the request to one of these request types may be recognized in order to identify the request type for the received request.

For some request types, asynchronous processing may be automatically applied to the request type, as indicated at 620. Request types that historically initiate the performance of long running processing to complete the request may be identified and placed on a list, index, or other set of data that is compared within incoming requests. Thus, a request to build an index, such as a secondary or alternative index for database table in the data store that already exists, may be automatically identified for asynchronous processing at it may be known historically that such requests are efficiently processed using asynchronous processing. If, as indicated by the positive exit from 620, the request is identified for automatic asynchronous processing, then the request may be identified for asynchronous processing, as indicated at 660.

Some request types may vary widely in the time in which it takes to process and complete the request type. Therefore, in at least some embodiments, request type alone may not be enough to determine whether to perform asynchronous processing. As indicated at 630, a processing time prediction may be determined for the request, in various embodiments. For example, a rolling average or some other processing time statistic or calculation may be made with respect to types of requests received at the network-based data store, either specific to a particular client or user account associated with the requests, or that type of requests overall independent of client or user account. In at least some embodiments, machine-based learning may be applied to historical processing times collected for different requests received at network-based data store (whether processed synchronously or asynchronously) to identify common features of requests indicative of processing times. Consider the scenario where data may be stored in a distributed fashion in the data store, amongst multiple data partitions (as discussed above with regard to the storage nodes in FIGS. 2 and 3). Based on the request, it may be determined how many partitions may need to be accessed, queried, operated upon, etc., in order for the request to be performed. Machine learning techniques that include feature selection may identify how long certain requests are processed based on the number of partitions involved in the request. Certain data queries, for instance, that involve a large number of partitions may be prone to longer processing times than queries involving few partitions. Using such historical data, a processing time prediction may be determined for the request.

As indicated at 640, a processing time prediction may be compared with an asynchronous processing time threshold. The asynchronous processing time threshold may be specific to request type, or may be generally set for comparing with every type of request. In at least some embodiments, the asynchronous processing time threshold may be adjustable, either in automated or manual fashion. For example, request load on a frontend task engine may increase or decrease depending on peak and off peak utilization times for the data store. Therefore, it may be beneficial to decrease the asynchronous processing time threshold during peak times in order to make the frontend task engine more available to meet the higher amount of incoming requests. Contrarily, the asynchronous processing time threshold may be raised during off peak times. For those requests that exceed the asynchronous processing time threshold, as indicated by the positive exit from 640, the request may be identified for asynchronous processing. Otherwise, as indicated by the negative exit from 640, the request may be identified for synchronous processing.

The methods described herein may in various embodiments be implemented by any combination of hardware and software. For example, in one embodiment, the methods may be implemented by a computer system (e.g., a computer system as in FIG. 7) that includes one or more processors executing program instructions stored on a computer-readable storage medium coupled to the processors. The program instructions may be configured to implement the functionality described herein (e.g., the functionality of various servers and other components that implement the distributed systems described herein). The various methods as illustrated in the figures and described herein represent example embodiments of methods. The order of any method may be changed, and various elements may be added, reordered, combined, omitted, modified, etc.

Figure 7:
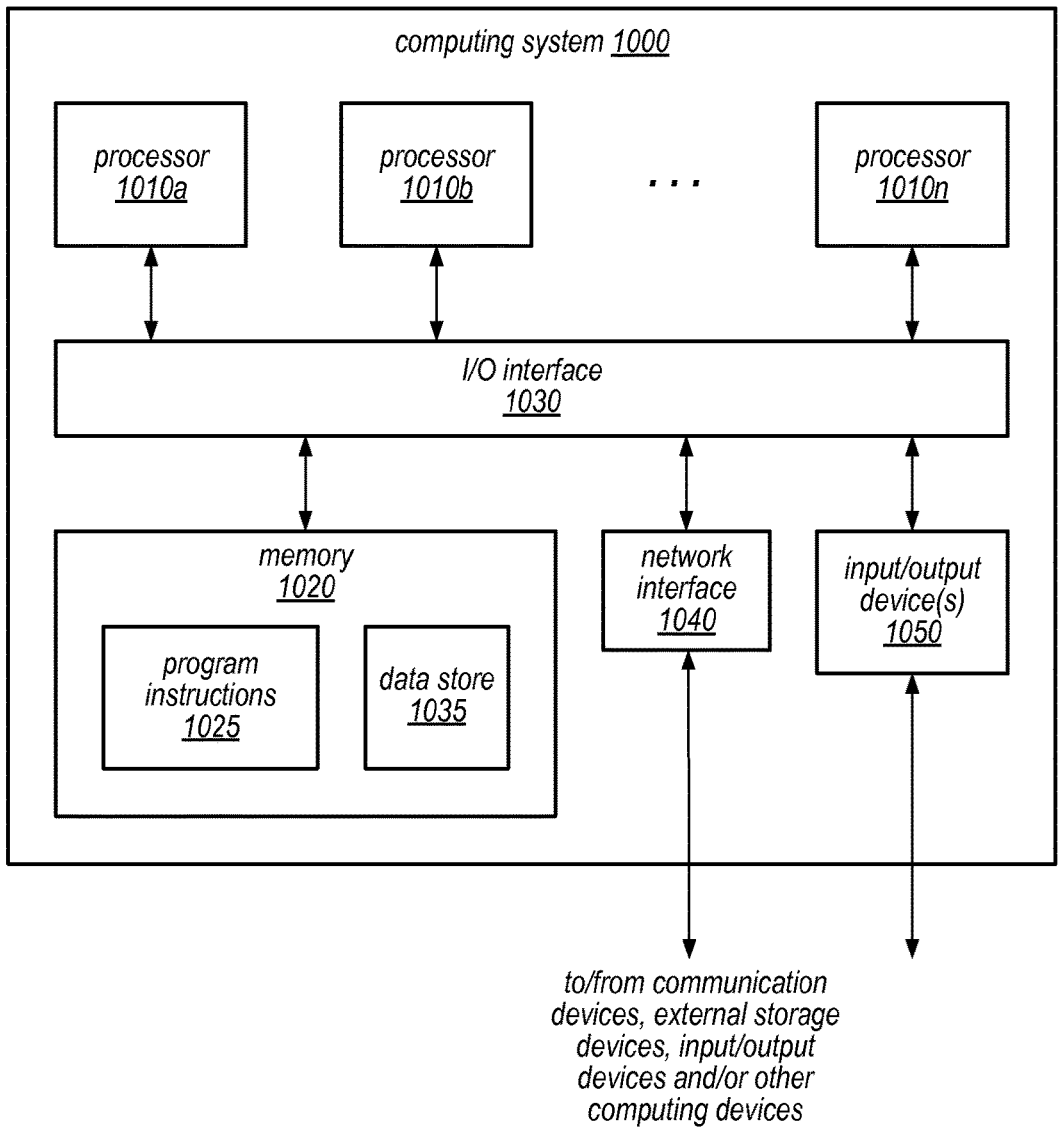
FIG. 7 is a block diagram illustrating an example computing system, according to some embodiments.

Embodiments of identifying requests directed to network-based data stores for asynchronous processing as described herein may be executed on one or more computer systems, which may interact with various other devices. One such computer system is illustrated by FIG. 7. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device, keyboard, and display(s). Display(s) may include standard computer monitor(s) and/or other display systems, technologies or devices. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s).

System memory 1020 may be configured to store program instructions 1025 and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 7, memory 1020 may include program instructions 1025, configured to implement the various embodiments of the systems as described herein, and data store 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 1000 may be transmitted to computer system 1000 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A distributed storage system, comprising:
 a plurality of compute nodes, configured to implement:
   a frontend task engine that processes requests for the distributed storage system;
   a plurality of backend task engines that process requests for the distributed storage system;
   a task sweeper that collect information for the distributed storage system;
   a network-based interface for the distributed storage system;
 a plurality of storage nodes, configured to store data for the distributed storage system;
 the frontend task engine, configured to:
   receive a request via the network-based interface for the distributed storage system;

evaluate the request to identify the request for asynchronous processing;
direct one or more of the backend task engines to process the request;
upon the direction of the one or more backend task engines to process the request, reclaim resources for processing the request at the frontend task engine for processing other requests received at the frontend task engine;
the task sweeper, configured to:
detect that the request has completed based, at least in part, on information collected from the one or more backend task engines; and
provide an indication that the request is completed.

2. The system of claim 1, wherein to evaluate the request the frontend task engine is configured to identify a request type for the request.

3. The system of claim 1, wherein the frontend task engine is further configured to:
receive a different request via the network-based interface for the distributed storage system;
evaluate the different request to identify the request for synchronous processing;
direct synchronous processing of the different request such that resources for processing the different request are reserved for the request until processing of the different request is complete;
upon determining that the different request has completed, reclaim the resources for processing the different request at the frontend task engine for processing other requests received at the frontend task engine.

4. The system of claim 1, wherein the distributed storage system is a network-based non-relational database service that stores a plurality of different data tables for a plurality of different clients, wherein the request is a service request to create a secondary index for one of the data tables, wherein a primary index for the data table was previously created along with the data table.

5. A method, comprising:
performing, by one or more computing devices:
receiving a request at a frontend task engine that processes requests for a network-based data store, wherein the request is received via a network-based interface for the network-based data store;
evaluating, at the frontend task engine, the request to identify the request for asynchronous processing at the network-based data store;
initiating, by the frontend task engine, processing of the request separately from the frontend task engine at one or more backend task engines of the network-based data store such that upon initiation resources for processing the request at the frontend task engine are reclaimed for processing other requests received at the frontend task engine;
detecting, by a task sweeper of the network-based data store that collects information from the one or more backend task engines, that processing of the request is complete; and
providing, by the task sweeper, an indication that processing of the request is complete.

6. The method of claim 5, wherein evaluating the request to identify the request for asynchronous processing at the network-based data store comprises:
determining a processing time prediction for the request; and
comparing the processing time prediction with an asynchronous processing time threshold; and in response to determining that the processing time prediction exceeds the asynchronous processing time threshold, identifying the request for asynchronous processing.

7. The method of claim 6, wherein the request is a query for particular data stored at the network-based data store.

8. The method of claim 5, wherein evaluating the request to identify the request for asynchronous processing at the network-based data store comprises identifying a request type for the request.

9. The method of claim 5, wherein detecting that processing of the request is complete comprises polling, by the task sweeper, a plurality of backend task engines of the network-based data store including the one or more backend task engines for task processing status information.

10. The method of claim 5, wherein providing the indication that processing of the request is complete comprises updating, by the task sweeper, a processing status for the request to indicate that the request completed.

11. The method of claim 5, further comprising:
receiving a different request via the network-based interface for the distributed storage system at the frontend task engine;
evaluating, by the frontend task engine, the different request to identify the request for synchronous processing;
initiating, by the frontend task engine, synchronous processing of the different request such that resources for processing the different request are reserved for the request until processing of the different request is complete; and
upon determining that the different request has completed, reclaim the resources for processing the different request at the frontend task engine for processing other requests received at the frontend task engine.

12. The method of claim 5, wherein the network-based data store is a multi-tenant database service that stores a plurality of different data tables for a plurality of different clients of the database service.

13. The method of claim 12, wherein the request is associated with a particular client of the database service, and wherein the request is a request to modify performance of at least one of the one or more backend task engines for performing subsequent requests received from the particular client.

14. A non-transitory, computer-readable storage medium, storing program instructions that when executed by one or more computing devices cause the one or more computing devices to implement:
receiving a request at a frontend task engine that processes requests for a network-based data store, wherein the request is received via a network-based interface for the network-based data store;
evaluating, at the frontend task engine, the request to identify the request for asynchronous processing at the network-based data store;
initiating, by the frontend task engine, processing of the request separately from the frontend task engine at one or more backend task engines of the network-based data store;
reclaiming resources for processing the request at the frontend task engine such that the resources are available for processing other requests received at the frontend task engine;

detecting, by a task sweeper of the network-based data store that collects information from the one or more backend task engines, that processing of the request is complete; and providing, by the task sweeper, an indication that processing of the request is complete.

15. The non-transitory, computer-readable storage medium of claim 14, wherein, in evaluating the request to identify the request for asynchronous processing at the network-based data store, the program instructions cause the one or more computing devices to further implement:

determining a processing time prediction for the request; and comparing the processing time prediction with an asynchronous processing time threshold; and in response to determining that the processing time prediction exceeds the asynchronous processing time threshold, identifying the request for asynchronous processing.

16. The non-transitory, computer-readable storage medium of claim 15, wherein the request is a query for particular data stored at the network-based data store received from a client of the network-based data store, and wherein, in providing the indication that processing of the request is complete, the program instructions cause the one or more computing devices to implement sending the particular data to the client.

17. The non-transitory, computer-readable storage medium of claim 14, wherein the program instructions cause the one or more computing devices to further implement:

receiving a different request via the network-based interface for the distributed storage system at the frontend task engine;

evaluating, by the frontend task engine, the different request to identify the request for synchronous processing;

initiating, by the frontend task engine, synchronous processing of the different request such that resources for processing the different request are reserved for the request until processing of the different request is complete; and upon determining that the different request has completed, reclaim the resources for processing the different request at the frontend task engine for processing other requests received at the frontend task engine.

18. The non-transitory, computer-readable storage medium of claim 14, wherein, in detecting that the processing of the request is complete, the program instructions cause the one or more computing devices to implement polling, by the task sweeper, a plurality of backend task engines of the network-based data store including the one or more backend task engines for task processing status information.

19. The non-transitory, computer-readable storage medium of claim 14, wherein, in providing the indication that processing of the request is complete, the program instructions cause the one or more computing devices to implement sending a completion acknowledgment to a client that sent the request to the network-based data store.

20. The non-transitory, computer-readable storage medium of claim 14, wherein the network-based data store is a non-relational database service that stores a plurality of different data tables for a plurality of different clients, wherein the request is a service request to create a secondary index for one of the data tables, wherein a primary index for the data table was previously created along with the data table.

* * * * *